United States Patent
Lee et al.

(10) Patent No.: US 6,378,383 B1
(45) Date of Patent: Apr. 30, 2002

(54) FAT-LINE TOWED-ARRAY FORCE MEASUREMENT APPARATUS

(75) Inventors: An-Keun Peter Lee, East Greenwich; Michael R. Williams, West Kingston, both of RI (US); Todd E. Whitaker, East Lyme, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/592,509

(22) Filed: Jun. 12, 2000

(51) Int. Cl.[7] .............................. G01L 1/26; G01V 1/38
(52) U.S. Cl. .................................... 73/862.393; 367/20
(58) Field of Search ..................... 73/862, 391, 862.42, 73/862.392, 862.393, 862.56, 862.57, 862.621, 862.627, 862.637; 367/20, 106, 130, 154

(56) References Cited

U.S. PATENT DOCUMENTS

| | | | | |
|---|---|---|---|---|
| 4,685,090 A | * | 8/1987 | Krevor | 367/20 |
| 5,046,055 A | * | 9/1991 | Ruffa | 367/154 |
| 5,714,693 A | * | 2/1998 | Sturn | 73/862.45 |
| 5,757,724 A | * | 5/1998 | Wilson et al. | 36/130 |
| 5,777,954 A | * | 7/1998 | Hepp | 367/20 |
| 5,781,508 A | * | 7/1998 | Peloquin | 367/154 |
| 5,948,959 A | * | 9/1999 | Peloquin | 73/1.83 |
| 6,088,297 A | * | 7/2000 | Stottlemyer | 367/131 |

* cited by examiner

*Primary Examiner*—Benjamin R. Fuller
*Assistant Examiner*—Andre Allen
(74) *Attorney, Agent, or Firm*—Michael J. McGowan; James M. Kasischke; Prithvi C. Lall

(57) ABSTRACT

An apparatus for measuring tensile and bending forces applied to a fat-line towed-array. Tension sensors are configured within a modified fat-line towed-array bulkhead to measure axial tension applied to the front of the fat-line towed-array, while bending sensors mounted further downstream along the fat-line canister interior walls, measure the bending load. The sensor outputs are encoded and digitized before transmitted through a tow line for further data conditioning and processing. The tension and bending sensor data provide information to evaluate the force exerted on the towed-array, allowing a measure of the deployment capability. Measurements taken at various fluid flow rates provide data regarding deployment effectiveness.

13 Claims, 3 Drawing Sheets

FAT-LINE TOWED-ARRAY FORCE MEASUREMENT APPARATUS

CROSS-REFERENCE TO RELATED PATENT APPLICATIONS

This patent application is co-pending with one other patent application entitled THIN-LINE TOWED-ARRAY FORCE MEASUREMENT APPARATUS AND METHOD U.S. application Ser. No. 09/592507, filed Jun. 12, 2000 by the same inventor as this application.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

1. Field of the Invention

The present invention relates generally to fat-line towed-arrays, and more particularly to an apparatus for measuring the force applied to fat-line towed-arrays during flushing cycles.

2. Description of the Prior Art

Submarines deploy fat-line towed-arrays using a process known as flushing, wherein water is pumped into the fat-line stowage tube to exert pressure upon and hence deploy the fat-line towed-array. Deployment success can be determined by measuring the flushing water force applied to the fat-line towed-array. Since effective deployments are critical to successful submarine missions, it is essential to maintain a method to evaluate the flushing mechanics and effectiveness. There is currently no reliable method to evaluate a submarine's flushing procedure. What is needed is an apparatus and method that measure and evaluate the flushing process effectiveness.

SUMMARY OF THE INVENTION

It is a general purpose and object of the present invention to provide a means of measuring the effectiveness of a submarine's flushing procedure for fat-line towed-arrays. It is a further object to use a combination of tension and bending sensors and measurements to evaluate the flushing system. It is another object to provide such tension and bending sensors as modules that can be connected to a fat-line towed-array. It is yet a further object to integrate the sensors with a tow cable for communication to a data processing system for evaluation.

Other objects and advantages of the present invention will become more obvious hereinafter in the specification and drawings.

These objects are accomplished with the present invention by sensors in the standard fat-line towed-array configuration at the typical telemetry positioning. Tension sensors located within a modified fat-line towed-array bulkhead measure axial tension applied to the front of the towed-array during the flushing cycle. Bending sensors mounted further downstream along the fat-line canister walls, measure the bending load during the flushing cycle. The sensor outputs are encoded and digitized before being transmitted through a tow cable for further data conditioning and processing. The tension and bending sensor data provide information to evaluate the force exerted on the fat-line towed-array thereby allowing a measure of the deployment capability and effectiveness.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

DESCRIPTION OF THE PREFERRED EMBODIMENT

Figure 1:
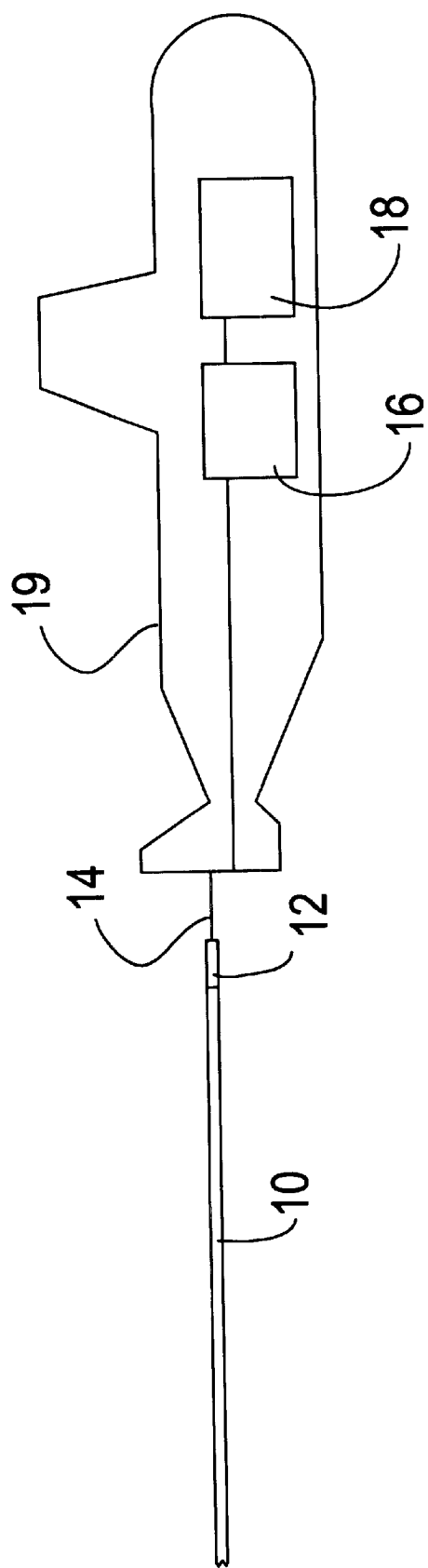
FIG. 1 provides a diagram of the general layout of the tow vessel, towed array and tow cable.

Referring now to FIG. 1, there is shown a basic system configuration. The measurement sensors are physically located within the fat-line towed-array 10, at the fat-line towed-array end nearest the nose cone assembly 12. The tow cable 14 provides an electrical connection to signal conditioning electronics 16 that amplify and filter signals, and interface to a computer 18. Electronics 16 and computer 18 are located on a tow vessel 19 joined to tow cable 14. The computer 18 collects the system sensor data and performs the final processing to evaluate system performance.

Figure 2:
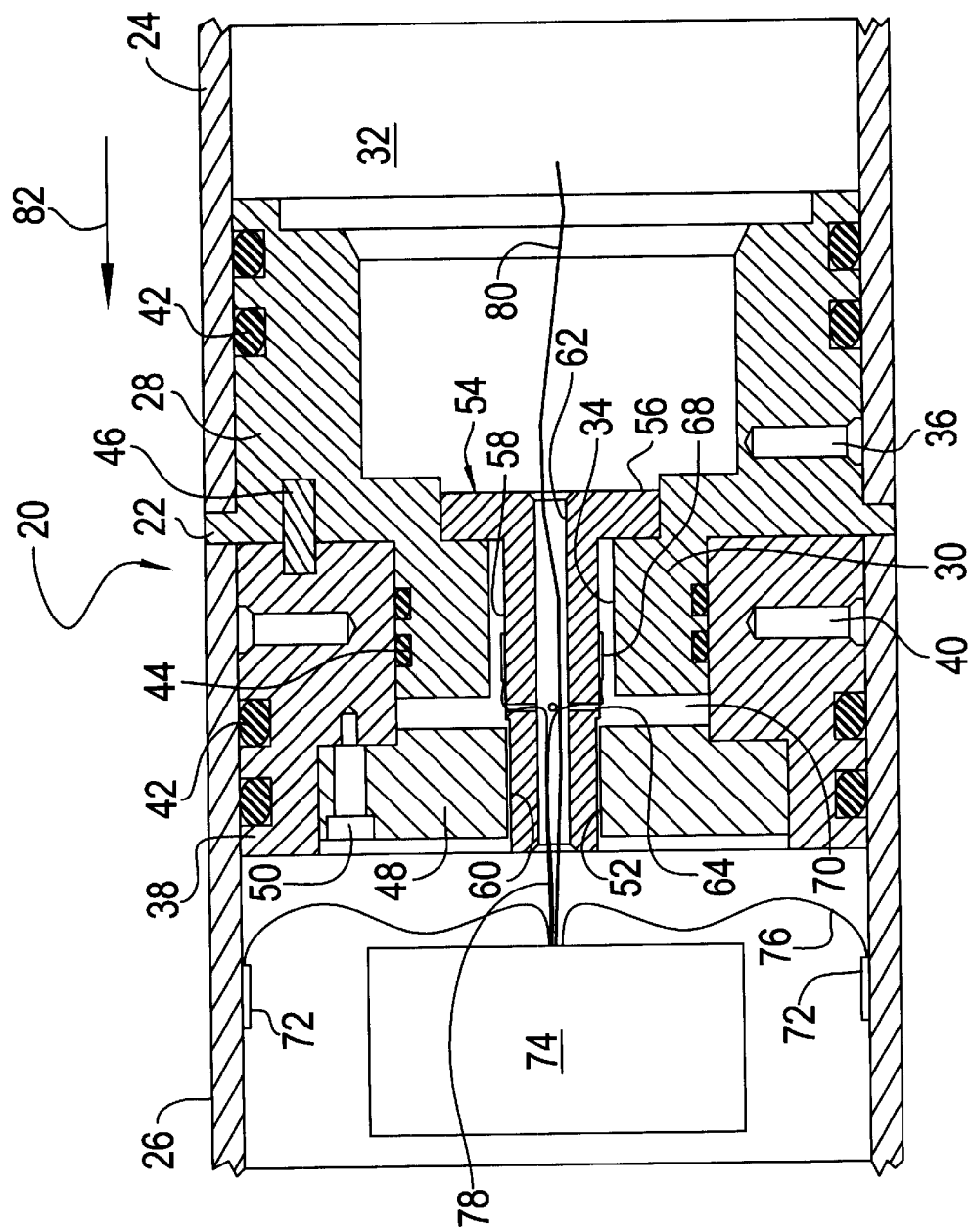
FIG. 2 shows a cross-sectional view of the sensor configuration contained within the fat-line towed-array.

In FIG. 2 there is shown a redesigned bulkhead 20 incorporating the tension sensors and bending sensors. The bulkhead 20 joins two sensor canisters at the bulkhead coupling 22. The coupling 22 is the same width as the first canister wall 24 and second canister wall 26, thereby allowing the bulkhead 20 to fit inside the towed-array sectional elements while allowing a strong coupling between the two sections. Forward bulkhead portion 28 is cylindrical with a tension shaft mounting cylinder 30 having a smaller diameter extending aftward. A forward bulkhead cavity 32 is formed within the main body of the forward bulkhead portion 28, and a tension shaft aperture 34 formed through the shaft mounting cylinder 30. Screw 36 to the right of the coupling 22 secure the first canister wall 24 to forward bulkhead portion 28. Aft bulkhead portion 38 is a hollow cylindrical structure having a forward bulkhead receiving cavity formed therein. Upon assembly, the forward bulkhead receiving cavity receives the shaft mounting cylinder 30. The second canister wall 26 is secured to the aft bulkhead portion 38 using screws 40 aft of the coupling 22. Double O-rings 42 are provided in slots formed in the forward bulkhead portion 28 and the aft bulkhead portion 38 on either side of the coupling 22 to prevent water leakage into the canister walls 24, 26. O-rings 44 prevent liquid from entering the bulkhead between the forward bulkhead portion 28 and the aft bulkhead portion 38. The forward bulkhead portion 28 contains an alignment key 46 or pin that is inserted into a slot in the aft bulkhead portion 38 to prevent the aft bulkhead portion 38 from rotating; however, the forward bulkhead portion 28 and the aft bulkhead portion 38 are not otherwise attached.

A disk shaped end cap 48 is secured to the aft bulkhead portion 38 using a screw 50. End cap 48 has a threaded tension shaft receiving aperture 52 formed at its center.

Figure 3:
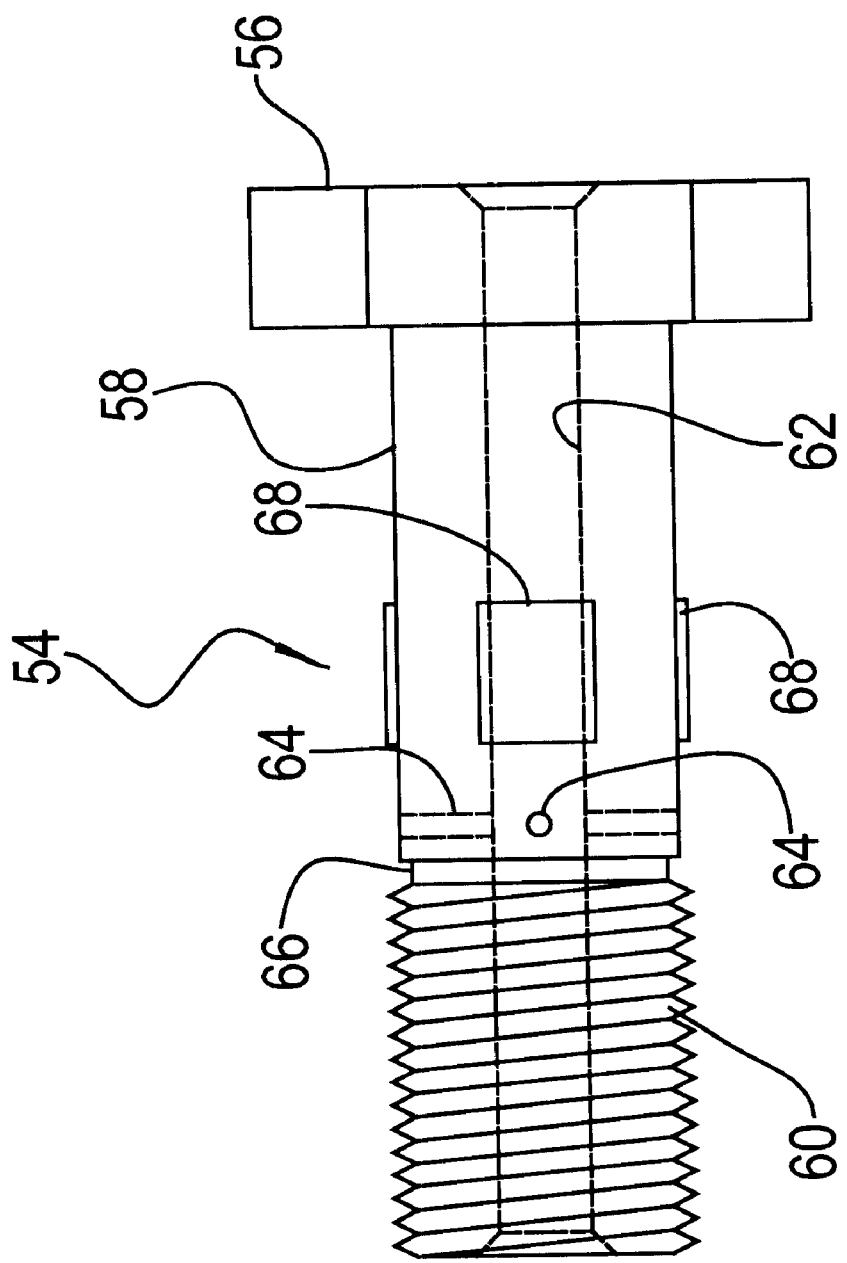
FIG. 3 shows a view of the tension shaft for sensing tension applied to the bulkhead.

A tension shaft 54, shown in more detail in FIG. 3, extends through the first bulkhead portion 28 shaft mounting cylinder 30 to the tension shaft receiving aperture 52. The tension shaft 54 allows sensor mounting for measuring tension in orthogonal directions between the two bulkhead sections. The tension shaft 54 is a single unit with a head 56, a sensor mounting section 58, a threaded section 60, a hollow core 62, feed apertures 64, and a decoupling groove 66. The tension shaft head 56 can be circular but it can also be square or hexagonal in cross-section to allow the use of a wrench for fastening. Hollow core 62 is formed in the center of shaft 54 and traverses the entire tension shaft length. Preferably core 62 is cylindrical in shape to avoid chafing cables running therethrough. The sensor mounting section 58, adjacent to the head 56, has a square cross-section with smooth surfaces on all sides for mounting tension sensors 68. Because the mounted sensors 68 provide outputs for recording, each side of the rectangular sensor mounting section 58 contains feed aperture 64 in communication with the hollow core 62 for transporting wiring.

A decoupling groove 66 in the tension shaft 54 decouples the sensor mounting section 58 from the circular threaded section 60. The threaded section 60 maintains a circular cross-section with threads for securing the tension shaft 54 to the end cap 48 threaded tension shaft receiving aperture.

The tension shaft 54 is mounted with tension shaft head 56 flush against the tension shaft mounting cylinder 30 and the sensor mounting section 58 extending into the tension shaft core 62. Sensor mounting section 58 does not contact the tension shaft mounting cylinder 30 in order to prevent interference with the sensors 68.

The forward bulkhead portion 28 and end cap 48 are separated by a space 70 that aligns with the tension shaft decoupling groove 66, and the forward bulkhead portion 28 and end cap 48 are not otherwise connected or attached.

Bending sensors 72 and electronics 74 are positioned within the measurement module canister. The bending sensors 72 are located on the second canister wall 26 where they measure the towed-array element bending caused by the fluid flow. The bending sensors 72 are electrically coupled by wire 76 to the sensor electronics 74. Electronics 74 are also coupled by wire 78 to the tension sensors 68. The sensor electronics 74 digitize and encode the sensor measurements for transmission through cable 80 to the tow cable 14 as shown in FIG. 1, to the signal conditioning unit 16.

The flushing fluid travels in the direction shown 82, and exerts pressure on the nose cone assembly that is measured by the tension sensors 68. The flushing liquid applies stress to the nose cone assembly and fat-line towed-array sections, and as the flushing liquid passes along the sides of the fat-line towed-array sections, tension is applied to the towed-array sections, including the two sections joined by the modified bulkhead. With the first fat-line towed-array section connected to the forward bulkhead portion, and the second fat-line towed-array section connected to the end cap, the tension caused by the fluid flow is translated to the bulkhead sections and hence the tension shaft 54 that joins the two bulkhead sections. Measurement devices located on the tension shaft 54 record the tension applied to the bulkhead sections.

In a preferred embodiment, tension sensors 68 and bending sensors 72 use strain gages as the active elements. For measuring tension, a single strain gage is attached to each of the four sides of the rectangular tension shaft sensor mounting section 58, thereby comprising two orthogonal wheatstone bridge configurations with two strain gages in each wheatstone bridge, providing two tension differential outputs to the sensor electronics. The strain gages are attached using epoxy. The bending sensors 72 are embodied as four additional strain gages, wheatstone configured to measure bend in two orthogonal directions. The bending sensors 72 are mounted on the interior walls of the second measurement module element using epoxy. Two strain gages comprise the first wheatstone bridge sensor, while a second strain gage pair form the orthogonal wheatstone bridge. The bending and tension sensors utilize the tension shaft hollow core 62 to transport the strain gage wiring 78 to the standard bulkhead connector fixture and hence the sensor electronics 74. The sensor electronics digitize and encode the tension and bend measurements for transmission to the signal conditioning electronics 16 that amplify and filter the digitized measurements. The computer 18 processes the tension and bend measurements for various fluid flow rates to determine the fluid effectiveness for fat-line towed-array deployment.

The advantage of the present invention over the prior art is that the disclosed invention provides a novel apparatus and method of measuring the effectiveness of fluid flow to deploy fat-line towed-arrays.

What has thus been described is an apparatus for measuring the force applied to the fat-line towed-array during a flushing cycle. Tension sensors reside in a modified bulkhead structure to measure axial tension applied to the front of the fat-line towed-array during the flushing cycle. Bending sensors mounted further downstream along the fat-line canister interior walls measure the bending load during the flushing cycle. The sensor outputs are encoded and digitized before being transmitted through a tow cable for further data conditioning and processing. The tension and bending sensor data provide information to evaluate the force exerted on the towed-array, thereby allowing a measure of the deployment capability. Measurements taken at various fluid flow rates provide data regarding deployment effectiveness.

Obviously many modifications and variations of the present invention may become apparent in light of the above teachings. For example, although strain gages were used as the sensors in the example provided, other sensing elements may be utilized. The strain gages may be configured differently than the wheatstone configurations described, and more than two groups of tension and/or bending sensors may be utilized. Although the strain gages were secured using epoxy, other adhesives or methods may be used. The digitizing and encoding electronics may be located within the fat-line towed-array canister, or at another location. There are many different bulkhead configurations that can be modified for the tension measurements. The procedure for securing the sensors to the tension shaft or canister wall can vary and is application dependent. Although the bulkhead plates described in the preferred embodiment were designed of aluminum, other materials may function equivalently. The signal conditioning functionality may be incorporated in the computer or in the sensor electronics.

In light of the above, it is therefore understood that within the scope of the appended claims, the invention may be practiced otherwise than as specifically described.

What is claimed is:
1. A measurement module comprising:
   a first hollow cylinder;
   a second hollow cylinder;
   a first bulkhead portion joined within said first hollow cylinder, said first bulkhead portion having a tension shaft aperture defined therethrough with a tension shaft mounting flange surrounding said tension shaft mounting aperture;
   a second bulkhead portion joined within said second hollow cylinder and positioned to abut said first bulkhead portion, said second bulkhead portion defining cylindrical hollow region therein;

an end cap joined to said second bulkhead portion and covering said defined cylindrical hollow region, said end cap having a central tension shaft mounting aperture therein;

a tension shaft having a head portion, a sensor mounting portion, and a fastening section, said tension shaft being disposed in said first bulkhead tension shaft aperture with said head portion supported by said tension shaft mounting flange, said sensor mounting portion extending through said first bulkhead tension shaft aperture and said fastening section joining said end cap at said tension shaft mounting aperture; and at least one tension sensor disposed on said tension shaft sensor mounting portion.

2. The device of claim 1 further comprising at least one bending sensor mounted inside a selected one of said first hollow cylinder and said second hollow cylinder.

3. The device of claim 2 further comprising sensor electronics electrically joined to said at least one bending sensor and said at least one tension sensor for encoding sensor measurements for transmission.

4. The device of claim 3 further comprising signal processing electronics in communication with said sensor electronics for receiving said encoded sensor measurements.

5. The device of claim 4 further comprising a computer in communication with said signal processing electronics for processing, storing and displaying said sensor measurements.

6. The device of claim 2 wherein said at least one tension sensor is a pair of strain gages.

7. The device of claim 6 wherein said at least one bending sensor is a pair of strain gages.

8. The device of claim 7 wherein:

each said tension sensor strain gage pair is wired in a wheatstone bridge configuration; and each said bending sensor strain gage pair is wired in a wheatstone bridge configuration.

9. The device of claim 1 wherein:

said tension shaft has a hollow core formed axially therethrough;

said tension shaft head portion is larger than said sensor mounting portion preventing said tension shaft from passing through said tension shaft aperture;

said sensor mounting portion having at least one flat surface on the exterior thereof for mounting said at least one tension sensor, and said sensor mounting portion having at least one aperture formed therein extending from said flat surface to said hollow core;

said fastening section being externally threaded; and said end cap tension shaft mounting aperture being internally threaded for receiving said fastening section.

10. The device of claim 9 further comprising:

at least one bending sensor mounted inside a selected one of said first hollow cylinder and said second hollow cylinder; and sensor electronics electrically joined to said at least one bending sensor and said at least one tension sensor for encoding sensor measurements for transmission;

said at least one tension sensor being electrically joined by wiring joined to the sensor extending through said tension shaft mounting section aperture to said tension shaft hollow core and along said hollow core to said sensor electronics.

11. The device of claim 9 wherein said tension shaft further comprises a decoupling groove formed in said tension shaft between said sensor mounting portion and said fastening section.

12. The device of claim 1 further comprising rotation prevention means positioned between said first bulkhead portion and said second bulkhead portion.

13. The device of claim 12 wherein said rotation prevention means comprises:

said first bulkhead portion having a pin aperture formed therein;

said second bulkhead portion having a pin aperture formed therein; and an anti-rotation pin positioned in said first bulkhead pin aperture and said second bulkhead pin aperture.

* * * * *